(12) United States Patent
Webb et al.

(10) Patent No.: US 10,176,081 B1
(45) Date of Patent: Jan. 8, 2019

(54) MONITORING OF APPLICATION PROGRAM INTERFACE INTEGRATIONS

(71) Applicants: Jason Michael Webb, San Marcos, CA (US); Amit Ramchandra Jere, San Diego, CA (US); Thomas Barnes, San Diego, CA (US); Shashi R. Shilarnav, San Diego, CA (US)

(72) Inventors: Jason Michael Webb, San Marcos, CA (US); Amit Ramchandra Jere, San Diego, CA (US); Thomas Barnes, San Diego, CA (US); Shashi R. Shilarnav, San Diego, CA (US)

(73) Assignee: INTUIT INC., Mountain View, CA (US)

(*) Notice: Subject to any disclaimer, the term of this patent is extended or adjusted under 35 U.S.C. 154(b) by 43 days.

(21) Appl. No.: 15/143,489

(22) Filed: Apr. 29, 2016

(51) Int. Cl.
*G06F 9/44* (2018.01)
*G06F 11/36* (2006.01)

(52) U.S. Cl.
CPC .............................. *G06F 11/3668* (2013.01)

(58) Field of Classification Search
CPC .................................................. G06F 11/3668
See application file for complete search history.

(56) References Cited

U.S. PATENT DOCUMENTS

| | | | |
|---|---|---|---|
| 2004/0039728 A1* | 2/2004 | Fenlon | H04L 41/0681 |
| 2005/0172306 A1* | 8/2005 | Agarwal | G06F 11/008 |
| | | | 719/328 |
| 2011/0131191 A1* | 6/2011 | Szyperski | G06F 9/542 |
| | | | 707/702 |
| 2012/0185736 A1* | 7/2012 | Sambamurthy | G06F 11/079 |
| | | | 714/47.3 |
| 2015/0205709 A1* | 7/2015 | Michelsen | G06F 11/323 |
| | | | 714/38.1 |

* cited by examiner

*Primary Examiner* — Hang Pan
(74) *Attorney, Agent, or Firm* — Ferguson Braswell Fraser Kubasta PC

(57) ABSTRACT

A method for monitoring application program interface integrations is provided. The method includes identifying, based on monitored transactions, a plurality of run time dependencies between at least two services. Also, the method includes creating, for each of the identified dependencies, a context of the dependency. In addition, the method includes setting a baseline state of a system utilizing the contexts.

11 Claims, 7 Drawing Sheets

US 10,176,081 B1

MONITORING OF APPLICATION PROGRAM INTERFACE INTEGRATIONS

CROSS-REFERENCE TO RELATED APPLICATIONS

This application is related to U.S. patent application Ser. No. 15/143,492, filed Apr. 29, 2016, entitled "GATEWAY POLICY ENFORCEMENT AND SERVICE METADATA BINDING"; and U.S. patent application Ser. No. 15/143, 497, filed Apr. 29, 2016, entitled "CONFIGURATION DATA AS CODE".

BACKGROUND

As services are added to an on-demand environment, the number of dependencies between the services may quickly grow. As the dependencies between services grow, it is unlikely that the developer of a given service is fully aware of all upstream and downstream dependencies of the service. As a result of such blind interconnectedness, it may be protracted and difficult process to identify a broken system within the environment. Also, if the developer changes the behavior of the given service, or deploys some new software that otherwise changes the behavior of the service, then he or she may not be aware that some upstream or downstream dependencies have broken as a result. In an environment where there are a significant number of nested services integrations, a given integration may be left broken for weeks or months, depending on how often the integration is used.

SUMMARY

In general, in one aspect, the invention relates to a method for monitoring application program interface integrations. The method includes identifying, based on monitored transactions, a plurality of run time dependencies between at least two services. Also, the method includes creating, for each of the identified dependencies, a context of the dependency. In addition, the method includes setting a baseline state of a system utilizing the contexts.

In general, in one aspect, the invention relates to a system for monitoring application program interface integrations. The system includes a hardware processor and memory. Also, the system includes software instructions stored in the memory. The software instructions are configured to execute on the hardware processor, and, when executed by the hardware processor, cause the hardware processor to identify, based on monitored transactions, a plurality of run time dependencies between at least two services. Also, when executed by the hardware processor, the software instructions cause the hardware processor to create, for each of the identified dependencies, a context of the dependency. Additionally, when executed by the hardware processor, the software instructions cause the hardware processor to set a baseline state of a system utilizing the contexts.

In general, in one aspect, the invention relates to a non-transitory computer readable medium for monitoring application program interface integrations. The non-transitory computer readable medium stores instructions which, when executed by a computer processor, include functionality for identifying, based on monitored transactions, a plurality of run time dependencies between at least two services. Also, the non-transitory computer readable medium stores instructions which, when executed by the computer processor, include functionality for creating, for each of the identified dependencies, a context of the dependency. Still yet, the non-transitory computer readable medium stores instructions which, when executed by the computer processor, include functionality for setting a baseline state of a system utilizing the contexts.

Other aspects of the invention will be apparent from the following description and the appended claims.

DETAILED DESCRIPTION

Figure 1A:
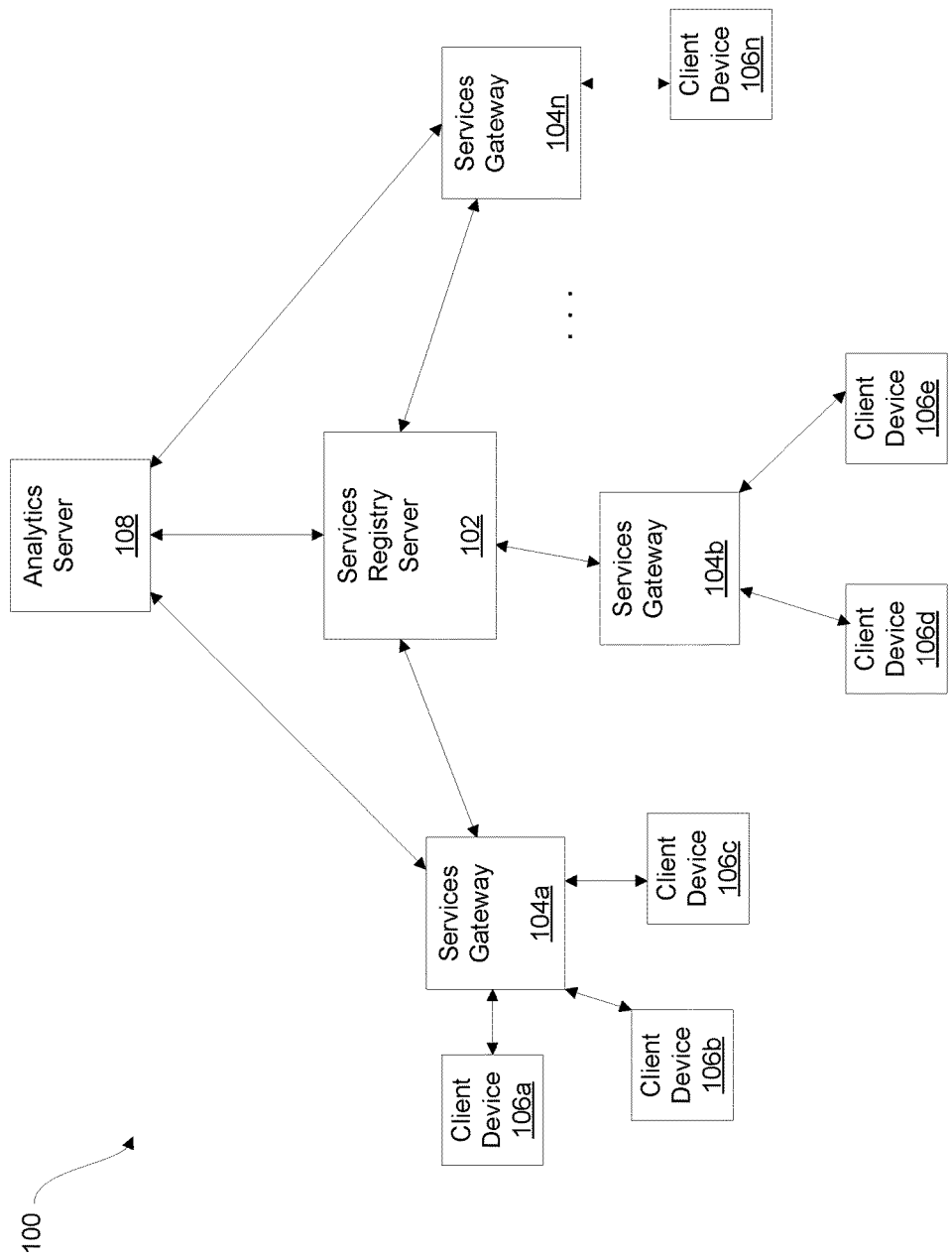
FIGS. 1A and 1B show schematic diagrams of a system for monitoring application program interface (API) integrations, in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the invention provide a method, a system, and a computer readable medium for monitoring application program interface (API) integrations. The following description provides methods, systems, and computer program products for monitoring API integrations for building contexts around service integrations. Further, as described below, the contexts allow for establishing a baseline state of a system, and for identifying irregularities that may adversely affect the performance of the system.

FIG. 1A shows a schematic diagram of a system (100) for monitoring API integrations, in accordance with one or more embodiments of the invention. The system (100) includes an analytics server (108) in communication with a services registry server (102) and one or more services gateways (104). The services registry server (102) is also in communication with the one or more services gateways (104), and the services gateways (104) are in communication with one or more client devices (106).

The analytics server (108) is in communication with a services registry server (102), a first services gateway (104a), a second services gateway (104b) (connection not shown), and a third services gateway (104n). Also, FIG. 1A shows the services registry server (102) in communication with the first services gateway (104a), the second services gateway (104b), and the third services gateway (104n), in accordance with one or more embodiments. Still yet, FIG. 1A shows the first services gateway (104a) in communication with a first client device (106a), a second client device (106b), and a third client device (106c); the second services gateway (104b) in communication with a fourth client device (106d) and a fifth client device (106e); and the third services gateway (104n) in communication with a sixth client device (106n).

As described herein, in accordance with one or more embodiments of the invention, communications between the analytics server (108), the services registry server (102), the services gateways (104), and/or the client devices (106) may occur via one or more computer networks to which the analytics server (108), the services registry server (102), the services gateways (104), and the client devices (106) are coupled. For example, the computer network(s) may include wired and/or wireless portions of public and/or private data networks, such as wide area networks (WANs), local area networks (LANs), the Internet, etc.

For purposes of simplicity and clarity, the system (100) is shown in FIG. 1A to include a single instance of the analytics server (108), a single instance of the services registry server (102), three services gateways (104), and six client devices (106). However, it is contemplated that the system (100) may include multiple analytics servers (108) and/or multiple services registry servers (102). As an option, in systems including multiple services registry servers (102), there may be a single logical services registry that is distributed such that the logical services registry is stored on multiple physical services registry servers (102). Moreover, it is contemplated that the system (100) may include any number greater than or less than three services gateways (104), and/or any number greater than or less than six client devices (106).

As described herein, in accordance with one or more embodiments of the invention, each of the client devices (106a-106n) includes software and/or hardware that sends requests to one or more of the services gateways (104a-104n). For example, each of the client devices (106a-106n) may include a desktop computer, portable computer (e.g., laptop, netbook, etc.), or mobile device (e.g., tablet computer, cellular phone, smartphone, etc.), etc. Moreover, each of the client devices (106a-106n) may include executing thereon one or more applications. As an option, an application may include a financial management application, such as accounting software or tax software. A request from one of the client devices (106) may include a message requesting access to one or more resources offered via the services gateways (104). For example, the request may include a GET request for retrieving data from a service, a PUT request for storing data to a service, etc. As an option, an application executing at one or more of the client devices (106) may be operating in response to user inputs received, for example, via a user interface at the client device (106). Still yet, a request from one of the client devices (106) may be sent in response to user input received at the respective client device (106). For example, a first services gateway (104a) may receive a request from accounting software executing on a first client device (106a), and a second services gateway (104b) may receive a request from tax software executing on another client device (106d).

As described herein, in accordance with one or more embodiments of the invention, each of the services gateways (104a-104n) includes software and/or hardware for receiving requests from client devices (106), and responding to the requests in accordance with configuration data received from the services registry server (102). As noted above, a request from a client device (106) may include a message requesting action or access with respect to one or more resources offered via the services gateways (104). In other words, the client devices (106) may access remotely hosted resources (e.g., services, applications, data, etc.) via the services gateways (104). Moreover, the services gateways (104) may control access to the remotely hosted resources based on configuration data received from the services registry server (102). Thus, the services gateways (104) may permit or reject access, by the client devices (106), to remotely hosted resources based on configuration data that originates from the services registry server (102), as described below.

As described herein, the services registry server (102) includes software and/or hardware that stores a services registry. The services registry includes a repository storing configuration data for use by each of the services gateways (104a-104n). In one or more embodiments, the services registry server (102) provides the configuration data stored within its services registry to the services gateways (104).

Figure 1B:
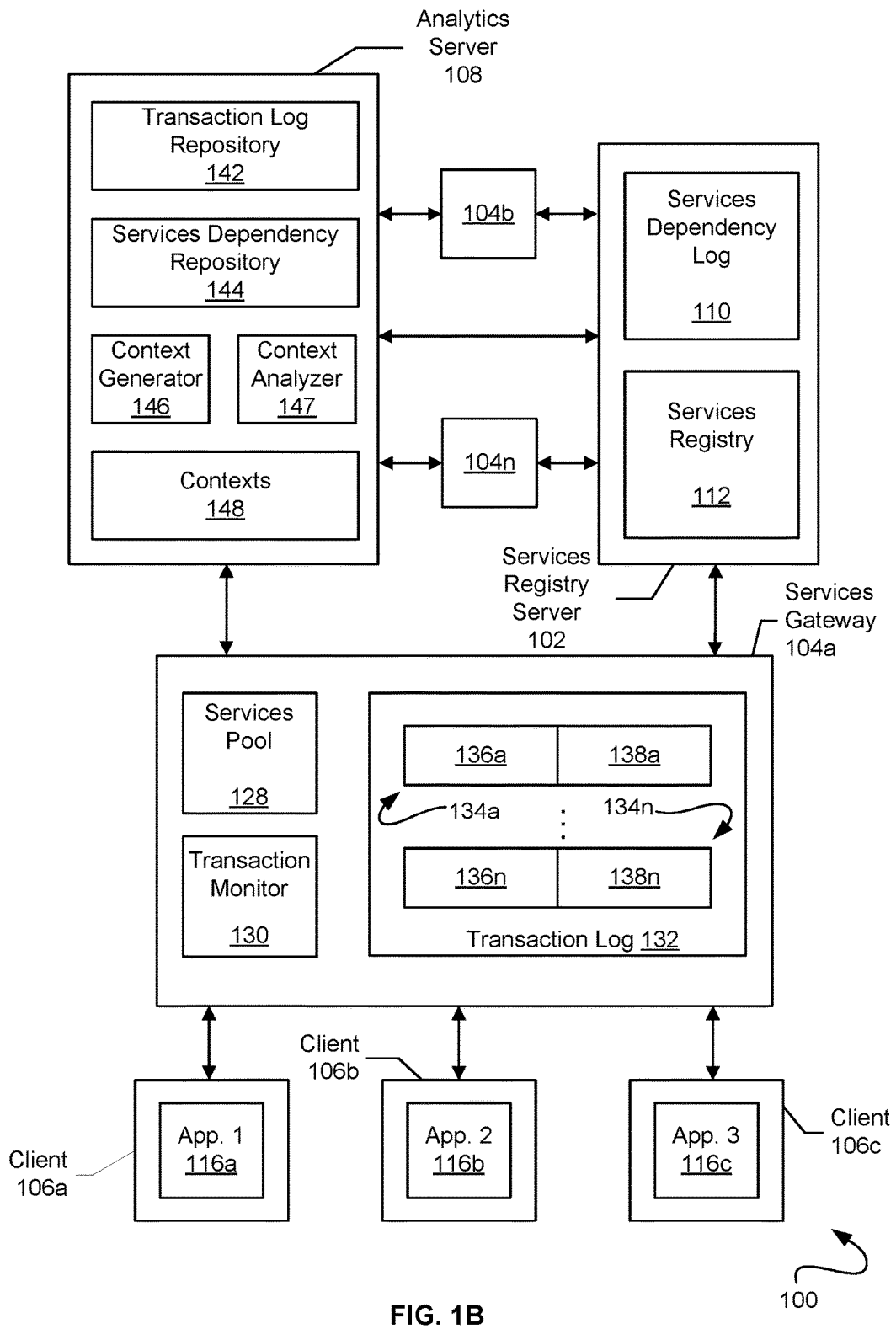

Referring now to FIG. 1B, another schematic diagram is shown of the system (100) for monitoring API integrations, in accordance with one or more embodiments of the invention. Specifically, FIG. 1B depicts the components of the analytics server (108), the services registry server (102), the services gateways (104), and the client devices (106).

As depicted in FIG. 1B, each of the client devices (106) is shown to be executing an application (116). Specifically, a first client device (106a) is shown to be executing a first application (116a), a second client device (106b) is shown to be executing a second application (116b), and a third client device (106c) is shown to be executing a third application (116c). As used herein, each application (116a-116c) may include a computer program or software. For example, each application (116a-116c) may include a financial management application, such as accounting software, tax software, or business management software.

For purposes of simplicity and clarity, the system (100) of FIG. 1B is depicted to include three client devices (106) communicating with the services gateway (104a), where each of the client devices includes an executing application (116). However, it is understood that hundreds or thousands or more client devices (106) may interact with a single services gateway (104). Moreover, each of the client devices (106) may be configured to execute more than one application (116), such that multiple applications (116) of a single client device (106) are concurrently in communication with the services gateway (104a).

The services gateway (104a) is shown to include services pool (128), a transaction monitor (130), and a transaction log (132). For purposes of clarity and simplicity, only the services gateway (104a) is depicted to include the services pool (128), transaction monitor (130), and the transaction log (132). However, it is contemplated that each of the other services gateways (104b-104n) may include its own respective services pool, as well as a corresponding transaction monitor. Accordingly, and as described below, other client devices may access resources via the services gateways (104b-104n), and such access may be recorded as transaction records within respective transaction logs, as described below. Thus, each of the services gateways (104a-104n) may log the respective transactions that flow through it.

In one or more embodiments, the services pool (128) includes one or more discrete services. As used herein, a service includes any resource accessible for use over a network. When accessed or called, a service may provide functionality or information. As an option, one or more of the services may be utilized by an application developed by a first party, second party, or third party application developer. In one or more embodiments, the services of the services pool (128) may include any combination of platforms, software applications, and/or processes. For example, the services pool (128) may include any combination of one or more identity services, one or more document services, one or more routing services, one or more commerce services, one or more data access services or platforms, one or more financial management applications (e.g., accounting platforms, tax management platforms, etc.), and/or one or more data exchange services.

In accordance with one or more embodiments of the invention, a service in the services pool (128) may include a corresponding application program interface (API). In other words, the services pool (128) may include numerous different services, where each of the services is associated with its own API. As an option, each API may include a set of remote calls for accessing the service it is associated with. For example, if the services pool (128) includes an identity service, then an API of the identity service may include one or more methods for calling the identity service to validate a device or user utilizing the identity service. Similarly, if the services pool (128) includes a document service, then the document service may include one or more methods for calling the document service to store, delete, or modify a file, folder, or object.

In one or more embodiments, the transaction log (132) includes include a plurality of transaction records (134), where each of the transaction records (134) is a record of at least a portion of a prior transaction. For example, a given transaction record (134) may evidence, in its entirety, a prior transaction. As another example, two or more different transaction records (e.g., transaction records (134a and 134n)) may together evidence a prior transaction, as described below. One or more transaction records (134) may be created for a given transaction regardless of whether the transaction ultimately succeeds or fails.

As used herein, a transaction includes a contract between two computing systems that results in an exchange or interaction between a client and at least one service. A transaction may include a single request. For example, a transaction may include, in its entirety, a request from a first client device (106a) (e.g., from the application (116a) executing on the first client device (106a)) to access a resource or service via the services gateway (104a), and a response from the services gateway (104a) to the client device (106a). The request may be a hypertext transfer protocol (HTTP) request. Accordingly, the transaction may include any response provided to the client device (106a) in response to the request.

As an option, a transaction may include a series of requests. In other words, a transaction may begin with a service on the services gateway (104a) receiving a request to access a resource from a first client device (106a), where the request received at the services gateway (104a) initiates a cascade of subsequent requests. For example, a transaction may include: a first request from a client device (106a) to a first service on the services gateway (104a); in response to the first request, a second request from the first service to a second service residing on any of the services gateways (104); a first response from the second service to the first service; and a second response from the first service to the initiating client device (106a). As a further example, a transaction may include a first request from a client to a first service, a second request from the first service to a second service, a third request from the second service to a fourth service, etc.

As depicted in FIG. 1B, each of the transaction records (134) is shown to include a client identifier (136) that identifies the client from which an API call originated, and to include a service identifier (138) that identifies a service targeted by the client (i.e., in a message, request, etc.). For example, the first transaction record (134a) includes a first client identifier (136a) that identifies a first client from which a first API call originated, and to include a first service identifier (138a) that identifies a service targeted by the API call of the first client; and the second transaction record (134n) is shown to include a second client identifier (136n) that identifies a second client from which a second API call originated, and to include a second service identifier (138n) that identifies a second service targeted by the API call of the second client.

In the context of the present description, any entity calling a service may herein be referred to as a "client." In one or more embodiments, one or more of the client devices (106) may call a service. For example, a client device (106) may call a service on the services gateway (104a) via a request that identifies the service being called. Moreover, a service may call another service, such that the "client" of a request (i.e., as identified by a client identifier (136)) may include a service of the service pool (128). For example, a first service in the services pool (128) may call a second service in the services pool (128). As an option, the first service may call the second service in the services pool using an API of the second service. In other words, the services in a services pool (128) may call each other, using their respective APIs, resulting in various service-service interactions and dependencies. As an option, services may call services that reside on other services gateways (104). Such calls may be communicated via a computer network. For example, a service on a second services gateway (104b) may call a service on the first services gateway (104a). In such examples, the calling service may be referred to as a "client."

In one or more embodiments, a single transaction may be evidenced by multiple transaction records (134). For example, a client device (106a) may send a first request to a first service of the services pool (128) of the first services gateway (104a). In response to the first request from the client device (106a), the first service may send a second request to a second service that resides in the services pool (128) of the first services gateway (104a), or in a services pool of another services gateway (104b-104n). In response to the second request to the second service, the second service may send a first response to the first service. Of course, prior to responding with the first response to the second request, the second service may send one or more additional requests (e.g., API calls) to additional services. Moreover, in response to the first response from the second service, the first service may send a second response to the client device (106a). In such an example, the first request, the second request, the first response, and the second response may together form a single transaction.

Moreover, in such an example, the first client identifier (136a) of the first transaction record (134a) may identify the client device (106a), and the first service identifier (138a) of the first transaction record (134a) may identify the first service. Similarly, the second client identifier (136n) of the second transaction record (134n) may identify the first service, and the second service identifier (138n) of the second transaction record (134n) may identify the second service. Still yet, the first transaction record (134a) may include information regarding the request from the client device (106a) to the first service (e.g., origin of the request, time of the request, content of the request, type of the request, etc.), and/or include information regarding the response from the first service to the client device (106a) (e.g., a duration, a content of the response, a type of the response, a code of the response, etc.). Similarly, the second transaction record (134n) may include information regarding the request from the first service to the second service (e.g., origin of the request, time of the request, content of the request, type of the request, etc.), and/or include information regarding the response from the second service to the first service (e.g., a duration, a content of the response, a type of the response, a code of the response, etc.).

Thus, a transaction record (134) may include any details regarding a client request and an action performed in response to the request. In this way, each of the transaction records (134) in the transaction log (132) may evidence a prior transaction, or a portion of a prior transaction. Accordingly, one or more transaction records (134) may evidence a number of related items of information that may be managed or monitored as a unit.

For purposes of simplicity, the transaction log (132) is depicted to include two transaction records (134a, 134n), however it is understood that the transaction log (132) may contain hundreds, thousands, hundreds of thousands, etc. transaction records (134), where each of the transaction records (134) may be associated with a request, API call, etc., that flowed through the services gateway (104a), and/or its corresponding response.

In one or more embodiments, each transaction record (134) may include a unique identifier for the transaction it evidences. Accordingly, where multiple transaction records (134) may be combined to evidence a single transaction, each of the transaction records (134) evidencing the single transaction may include the same unique identifier. In other words, a unique identifier may be used to assemble a sequence of related requests and corresponding responses into a single transaction. For a sequence of related requests and corresponding responses that are assembled into a single transaction, a client determined to initiate the sequence may be considered the origin of the transaction, and the last service to receive a request in the sequence may be considered the destination of the transaction. As described in below, the use of the unique identifiers enables the construction of an end-to-end transaction graph that allows for the tracing of a transaction through computing systems, from the origin and to the destination, and enables the identification of one or more points of failure within the transaction graph.

As an option, each transaction record (134) may include, for the request or call it evidences: a date, a time, a port, a method, a zone, an environment, an authentication type, an authorization type, a content type, an application from which the request originated, a type of the application, a size of the request, a destination of the request, an API used by the request, and/or a host. As an option, each transaction record (134) may identify, for the response to the request or call: a content type of the response, a size of the response, a status of the response, a code of the response (e.g., an HTTP response code, etc.), a phrase of the response, a payload transfer time of the response, and/or a duration from the request to the response. Accordingly, for one or more transaction records (134) that evidence a transaction, the one or more transaction records (134) may identify a client or origin of the transaction (e.g., an application, etc.), as well as a service or destination of the transaction (e.g., API, etc.). As described below, such information may be utilized to build an end-to-end transaction graph of the transactions in a given system or environment.

In one or more embodiments, the transaction monitor (130) of the services gateway (104a) monitors transactions flowing through the services gateway (104a) and records them to generate the transaction log (132). In other words, for a given response or request into or out of the services gateway (104a), the transaction monitor (130) creates a transaction record (134). More specifically, the transaction monitor (130) identifies the client and records a corresponding client identifier (136) in the transaction record (134), and identifies a destination service and records a corresponding service identifier (138) of the service in the transaction record (134). Of course, each transaction record (134) may include additional information regarding the request or response, such as a port, method, zone, content type, unique identifier, etc., as set forth above. In this way, a transaction record (134) may be created by the transaction monitor (130) for all transactions in the system (100) that invoke a service of the services pool (128) on the services gateway (104a).

Accordingly, the transaction log (132) of the services gateway (104a) may include a comprehensive history of requests from clients to the services of the services pool (128), and/or actions performed in response to the client requests. Further, multiple transaction records (134) may be combined to evidence a transaction from a beginning to an end of the transaction.

As noted above, a first service may call a second service in response to a request. Any call from the first service to the second service may evidence a dependence of the first service on the second service. More specifically, any dependencies that are identified by the transaction monitor (130) as the result of a request, and for which a corresponding transaction record (134) is created in the transaction log (132), are herein referred to as "run time dependencies." Run time dependencies may be identified at the services gateways (104) in real-time, as requests are received from clients at the services gateways (104). In other words, a run time dependency includes a dependency between a client and a service that has been observed to exist as the system (100) operates responsive to requests from the client devices (106).

Thus, because every request that is processed by a services gateway (104) may be logged, each services gateway (104a-104n) may collect a significant amount of data in a respective transaction log (132). As described below, these transaction logs (132) contain data that can be used to identify the upstream and downstream dependencies of a given service, to build a dependency graph of based on such dependencies, and to create a context around each service-service interaction or dependency.

Still yet, as depicted in FIG. 1B, the services registry server (102) of the system (100) is shown to include a services dependency log (110) and a services registry (112).

In one or more embodiments, the services registry (112) includes various services that may be deployed to the services gateways (104). For example, as a service is developed, tested, ready for production, etc., it may be stored within the services registry server (102). Moreover, each service may be associated with a status identifier that indicates its availability to the services gateways (104). The services gateways (104) may request services and/or configuration data from the services registry (112) of the services registry server (102).

In one or more embodiments, the services registry (112) includes configuration data. As used herein, the configuration data includes any information used for the configuration of the services gateways (104). As an option, such configuration data may be received from the services registry server (102) by a services gateway (104) over a computer network. After receiving such configuration data, the receiving services gateway (104) may thereafter configure itself based on the contents of the received configuration data. In one or more embodiments, the configuration data of the services registry (112) may include policy annotations and/or data bindings.

As an option, the services gateways (104) may enforce one or more policies against requests to access service. For example, a given client request may identify a service that is provided via a services gateway (104). The requested service may be on a route, such that the client request is matched to the route. Moreover, one or more particular policies may be bound to the route, such that the particular policies are executed against the request. Executing a policy may include any process that enforces rules or requirements defined by the policy based on an aspect of the request. As an option, the rules or requirements of the policy may be directed to a content of the request (e.g., an object targeted by the request), a timing of the request, a password contained in the request, etc. In addition, the rules or requirements of the policy may be directed to an origin of the request, such as, for example, a machine identifier, an IP address, a user name, an application, a geographic location, etc.

Accordingly, a policy annotation may include metadata describing one or more policies. For example, the policy annotations may include metadata describing one or more authentication protocols, describing one or more throttling processes, describing one or more authorization protocols, etc. Any policies on a services gateway (104) may be annotated based on the contents of the services registry (112). In this way, policy annotations in the services registry (112) may describe the different mechanisms that may be available to a services gateway (104) for enforcement against a request from a client, or for otherwise enhancing a request from a client.

As an option, the services registry (112) may include data bindings. The data bindings may include metadata that identifies the bindings between policies and routes. The deployment of data bindings from the services registry (112) to the services gateways (104) may enable the efficient execution of policies against the requests received from clients at the services gateways (104).

In one or more embodiments, the services dependency log (110) identifies one or more dependencies that may exist between the services of one or more services pools. For example, to successfully fulfill a client request, a given service may depend on one or more other services. In particular, the given service may call those one or more other services in response to receiving the client request. Moreover, the client request received at the given service may be called in response to a request received at yet another service, which then called the given service. In this way, a chain of dependencies may build between numerous services.

In one or more embodiments, the dependencies of a service may be determined by evaluating the code of the service, without actually calling or executing the service. Dependencies identified in such a manner are herein referred to as "design time dependencies." Design time dependencies of a service may be identified by the services registry server (102) and entered into the services dependency log (110) as the services are developed in the services registry (112), tested on the services registry (112), and/or deployed to the services registry (112). For example, when a service is deployed to the services registry (112), the code of the service may be scanned to identify any dependency on one or more other services (i.e., to identify whether the deployed services calls the one or more other services). As an option, a service or application may be on-boarded to one or more specific APIs using an API portal, and the design time dependencies are created based on the on-boarding to the one or more specific APIs. In this way, a design time dependency represents a potential dependency between a client and a service, where the client may not yet actively call the service.

Because not all identified design time dependencies are necessarily invoked during operation of the system (100), the run time dependencies identified and recorded in the transaction records (134) by the transaction monitor (130) may represent only a subset of the design time dependencies. In other words, some design time dependencies identified and stored at the services dependency log (110) may not be recorded as run time dependencies during operation of the system (100). As an option, because the design time dependencies represent all potential service-service interactions within the system (100), the design time dependencies in the services dependency log (110) may be used for projecting the maximum capacity of the system (100).

Additionally, as depicted by FIG. 1B, the system (100) for monitoring API integrations includes an analytics server (108). In one or more embodiments the analytics server (108) includes a transaction log repository (142), a services dependency repository (144), a context generator (146), a context analyzer (147), and contexts (148).

In one or more embodiments, the analytics server (108) may receive the transaction records (134) from the transaction logs (132) of the services gateways (104). In other words, the transaction records (134) collected at the services gateways (104) may be sent to the analytics server (108) for storage in the transaction log repository (142). Accordingly, all transaction records (134) collected by the services gateways (104) of the system (100) may be collected at a central location in the transaction log repository (142).

In one or more embodiments, the analytics server (108) may receive the design time dependencies recorded in the services dependency log (110) from the services registry server (102). In other words, design time dependencies collected at the services registry server (102) may be sent to the analytics server (108) for storage in the services dependency repository (144). In this manner, the run time dependencies identified in the transaction records (134) at the services gateways (104), as well as the design time dependencies identified in the services dependency log (110), may be collected together at a single location—the analytics server (108).

In one or more embodiments, the transaction log repository (142) and/or the services dependency repository (144) may each be any type of storage unit and/or device (e.g., a file system, database, collection of tables, or any other storage mechanism) for storing data. Further, the transaction log repository (142) and/or the services dependency repository (144) may each include multiple different storage units and/or devices. The multiple different storage units and/or devices may or may not be of the same type or located at the same physical site.

In one or more embodiments, the context generator (146) operates to generate one or more contexts (148) based on a content of the transaction log repository (142) and/or the services dependency repository (144). As an option, a context may be created for each identified service-service dependency within the transaction log repository (142) and/or the services dependency repository (144). As used herein a context includes a collection of information that describes the interaction between two services during operation of the system (100). Accordingly, each context may be built using design time dependencies and/or run time dependencies that have been identified to exist between the two services.

As an option, each of the contexts (148) may describe several attributes of the respective service-service dependency. For example, a given context may include HTTP status codes, an average request size, an average response payload size, a duration for each request, a duration for each transaction, and an authentication type. Of course, however, such examples are intended to be non-limiting, and a context may include any information related to a transaction and found in a related transaction record (134). Accordingly, any information recorded in the transaction records (134) by the transaction monitor (130) may be utilized to identify the characteristics of a service-service interaction. Moreover, one or more points of information in the transaction may be used to calculate a new point of information in a context. For example, the information in two different transaction records may be utilized to calculate a difference in time, a summation of time, an average time, etc. for inclusion in a context around a given service-service interaction.

In one or more embodiments, some of the contexts (148) may be generated to correspond with different historical periods. For example, a first context of a service-service interaction may summarize the integration of the two services during a day or week, while a second context of the service-service interaction may summarize the integration of the two services during a month, year, etc. As an option, a context may be generated for a specific prior time period, such as a specific day last month, a specific week last month, a specific day last year, or a specific week last year, etc. Such contexts may be useful for identifying a baseline integration between two services that experience seasonal variations. For example, where a first service is tightly coupled to a tax preparation platform, a first context built around the interaction of the first service with another service during the month of April may vary greatly from a second context built around the interaction of the first service with the same other service during the month of September.

In this way, the context generator (146) may use run time dependency information from the transaction log repository (142) and design time dependency information from the services dependency repository (144) to build contexts around the baseline state (i.e., expected operating state) of the system (100). Because the characteristics of such service-service interactions may rely on one or more API calls between the services, the dependencies may also be herein referred to as "API integrations." Accordingly, the contexts may describe different API integrations at numerous different periods of time.

In one or more embodiments, after the contexts (148) have been built, a context analyzer (147) may set a baseline state of the system (100). In particular, because a given one of the contexts (148) may represent the functioning interaction between two services during operation of the system (100), numerous contexts (148) when taken together may represent an overall state of the system (100) during operation at a given time.

In one or more embodiments, the context analyzer (147) may monitor the creation of new contexts during the operation of the system (100). Moreover, the context analyzer (147) may compare the newly created contexts previously built around the baseline state of the system (100). For example, the newly created contexts may be compared to a baseline state of the system (100) from a prior week, a prior month, a prior year. As an option, based on such comparison, the context analyzer (147) may detect that operation of the system (100) has departed from the previously determined baseline. For example, it may be determined that operation the system (100) deviates beyond a threshold value from a baseline state of the system (100) established during the prior week, during the prior month, or at the current time (e.g., date, week, month, etc.) last year. In this manner, not only may the context analyzer (147) identify deviations from standard operation of the system (100), but it may also account for seasonal fluctuations in the baseline activity of the system (100) due to seasonal variables (e.g., tax season, holiday season, etc.). In this way, the context analyzer (147) may evaluate the contexts (148) to detect changes deep within a services dependency chain.

Under some circumstances, a detected change or deviation in a context for two services may be planned or expected. However, sometimes a detected change or deviation in the context for two services may mean that an impactful event has occurred, and requires further investigation by an engineer or administrator. Accordingly, the context analyzer (147) may be operative to alert human personnel in response to detected changes or deviations.

While FIGS. 1A and 1B show a configuration of components, other configurations may be used without departing from the scope of the invention. For example, various components may be combined to create a single component. As another example, the functionality performed by a single component may be performed by two or more components.

Figure 2:
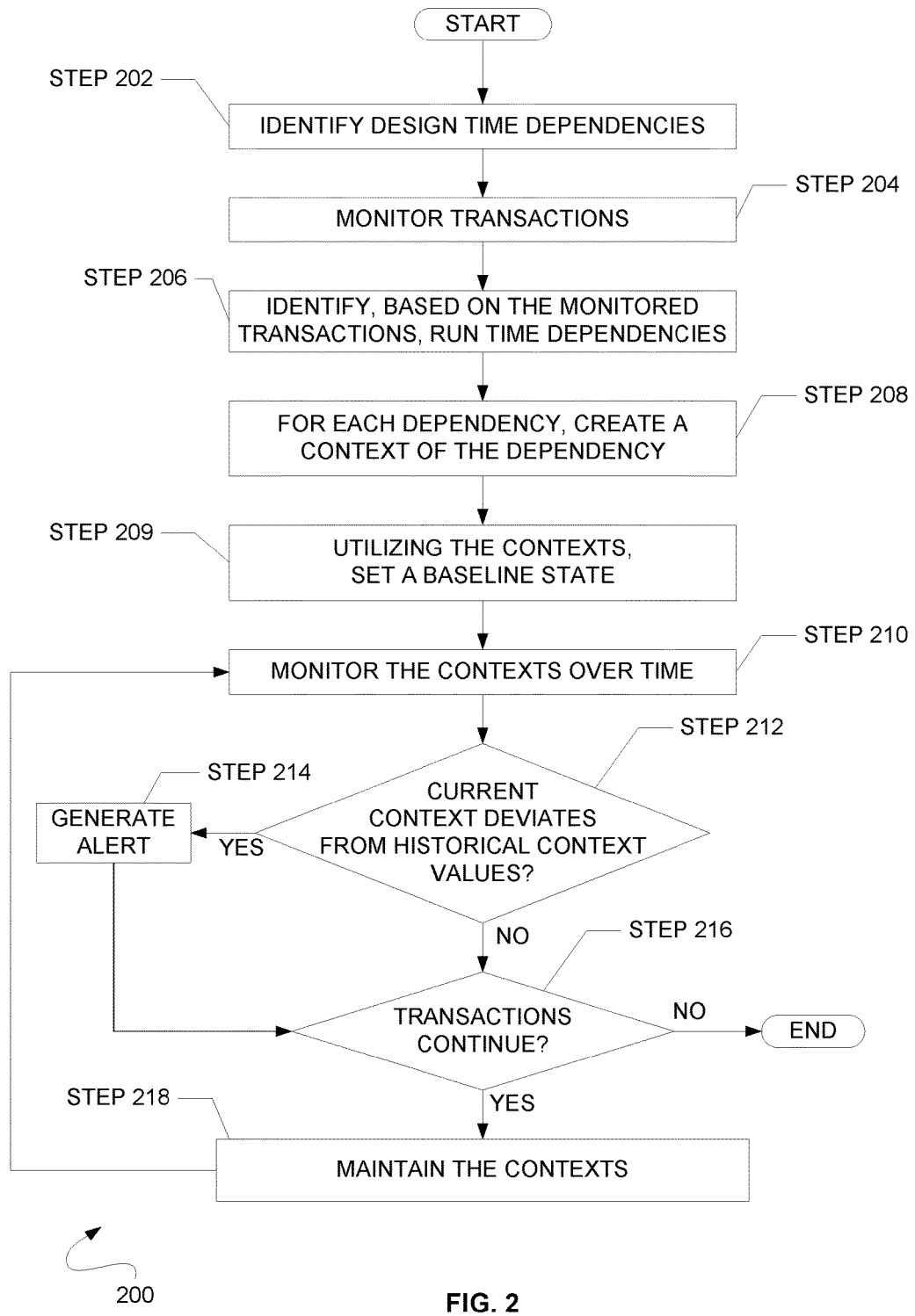
FIG. 2 shows a flowchart of a method of monitoring API integrations, in accordance with one or more embodiments of the invention.

FIG. 2 depicts a flowchart of a method (200) for monitoring API integrations, in accordance with one or more embodiments of the invention. In one or more embodiments, one or more of the steps shown in FIG. 2 may be omitted, repeated, and/or performed in a different order. Accordingly, embodiments of the invention should not be considered limited to the specific arrangements of steps shown in FIG. 2. In one or more embodiments, the method (200) described in reference to FIG. 2 may be practiced using the system (100) described in reference to FIGS. 1A and 1B, above, and/or involving the computing system (400) described in reference to FIG. 4.

At Step 202, the design time dependencies of various services are identified. In one or more embodiments, service configuration data may be stored at a services registry of a services registry server. Moreover, the design time dependencies may be identified by the services registry server analyzing services code that is stored within the services registry. Accordingly, the design time dependencies may be identified without the services being executed.

Also, at Step 204, transactions are monitored. The transactions may include requests to access the services previously analyzed to identify design time dependencies (at Step 202). In one or more embodiments, each transaction may include one or more client request (e.g., API calls, etc.), and/or one or more responses. In one or more embodiments, the transactions may be monitored by one or more transaction monitors executing on respective services gateways. For example, for each services gateway that is sending or receiving client requests, and/or sending or receiving responses to client requests, a transaction monitor of the services gateway may monitor the transactions and create a transaction record for each transaction. In other words, for each gateway with transactions passing through, a transaction monitor of the gateway may monitor the transactions and create numerous different transaction records that evidence the details of the activity.

Still yet, at Step 206, one or more run time dependencies are identified based on the monitored transactions. As noted above, any call from a first service to a second service may evidence a dependence of the first service on the second service. Moreover, any dependencies that are identified as the result of a client request, and for which a corresponding transaction record is created in a transaction log, may be considered a run time dependency. As an option, the run time dependencies may be identified at one or more services gateways, in real-time or near real-time, as requests are received from clients at the services gateways.

For each of the design time dependencies identified at Step 202, and the runtime dependencies identified at Step 206, a context of the dependency is created at Step 208. Thus, a context may be created for each identified service-service design time dependency and/or run time dependency. As previously noted, each context includes a collection of information that describes the interaction between two services during operation of a system. For example, a given context may include HTTP status codes, an average request size, an average response payload size, a duration for each request, a duration for each transaction, and an authentication type.

As an option, for an identified service-service interaction that includes a design time dependency but not a run time dependency, a context for the interaction may include information evidencing the potential for such interaction. Moreover, such context may indicate the lack of activity between the two specific services during run time. Accordingly, each context may be built using design time dependencies and/or run time dependencies that have been identified to exist between the two services.

Additionally, using the contexts created a Step 208, a baseline state is created at Step 209. In one or more embodiments, the baseline state of a system may include an historical operating state of the system, or an expected operating state of the system at a given time. The past interaction between numerous services during the proper operation of the system may evidence an expected pattern of service-service interaction for a future point in time. Accordingly, using the run time dependencies and the design time dependencies, the baseline state of the system may be identified and established for future reference.

Still yet, at Step 210, the contexts are monitored over time, and, at Step 212, it is determined whether a current context deviates from one or more historical context values. Moreover, if it is determined that a current context deviates from a historical context value, then an alert may be generated at Step 214.

In one or more embodiments, after a baseline state has been set for a system, the system may continue to operate by hosting platforms or applications, serving client devices, etc. As the system operates, services may continue to call other services. The continued interaction between services may be monitored to detect a change or deviation in a context of one or more service-service dependencies. Thus, by monitoring the continued interaction between services, it may be determined whether a current value of one of the contexts deviates beyond a pre-determined threshold from a historical value of the one of the contexts.

For example, for a given first service and second service, a context for the integration of the first service and the second service may be built based on design time dependencies and run time dependencies identified to exist between the two services. Moreover, the context may be used to set the baseline state of the system. During operation of the system, the integration of the first service and the second service is continually monitored to generate new contexts, and the new contexts may be compared to the context used to set the baseline state of the system. If it is determined that one of the new contexts deviates, beyond a threshold from the context used to set the baseline state of the system, then an alert may be generated at Step 214.

In one or more embodiments, the alert generated at Step 214 may include a message that is transmitted to an administrator or engineer. Moreover, the alert may identify the pertinent services and/or integration between the services. In this manner, whenever the interaction between two services deviates from a previously set baseline, any deviation from the baseline may be used to quickly identify the potential point of concern.

Still yet, at Step 216, it is determined whether the system remains operational and transactions continue to flow through the system. If it is determined, at Step 216, that the system is no longer operational, then the method (200) ends. However, if the system continues to operate, then, at Step 218, the previously established contexts are maintained.

In one or more embodiments, maintaining the contexts may include analyzing newly identified service dependencies, as well as any changes between previously identified service-service interactions. Any new dependencies or service-service interactions may be utilized to create new contexts. Moreover, any changes in the characteristics of a previously-identified service-service interaction may result in an update to a context utilized to set the baseline state of a system. For example, if, due to seasonal patterns of use or changes in system hardware, it is typical for a particular transaction to now require an additional 200 ms to complete successfully, then one or more contexts around the transaction may be updated to reflect the additional time required. In other words, one or more contexts may be updated with new values based on changing operating conditions or characteristics. Moreover, an updated context may be reflected in an updated baseline of the system. Accordingly, by maintaining and updating the individual contexts, the baseline state of the system may change over time to match usage patterns and other realities, and the generation and issuance of erroneous alerts may be avoided.

Figure 3A:
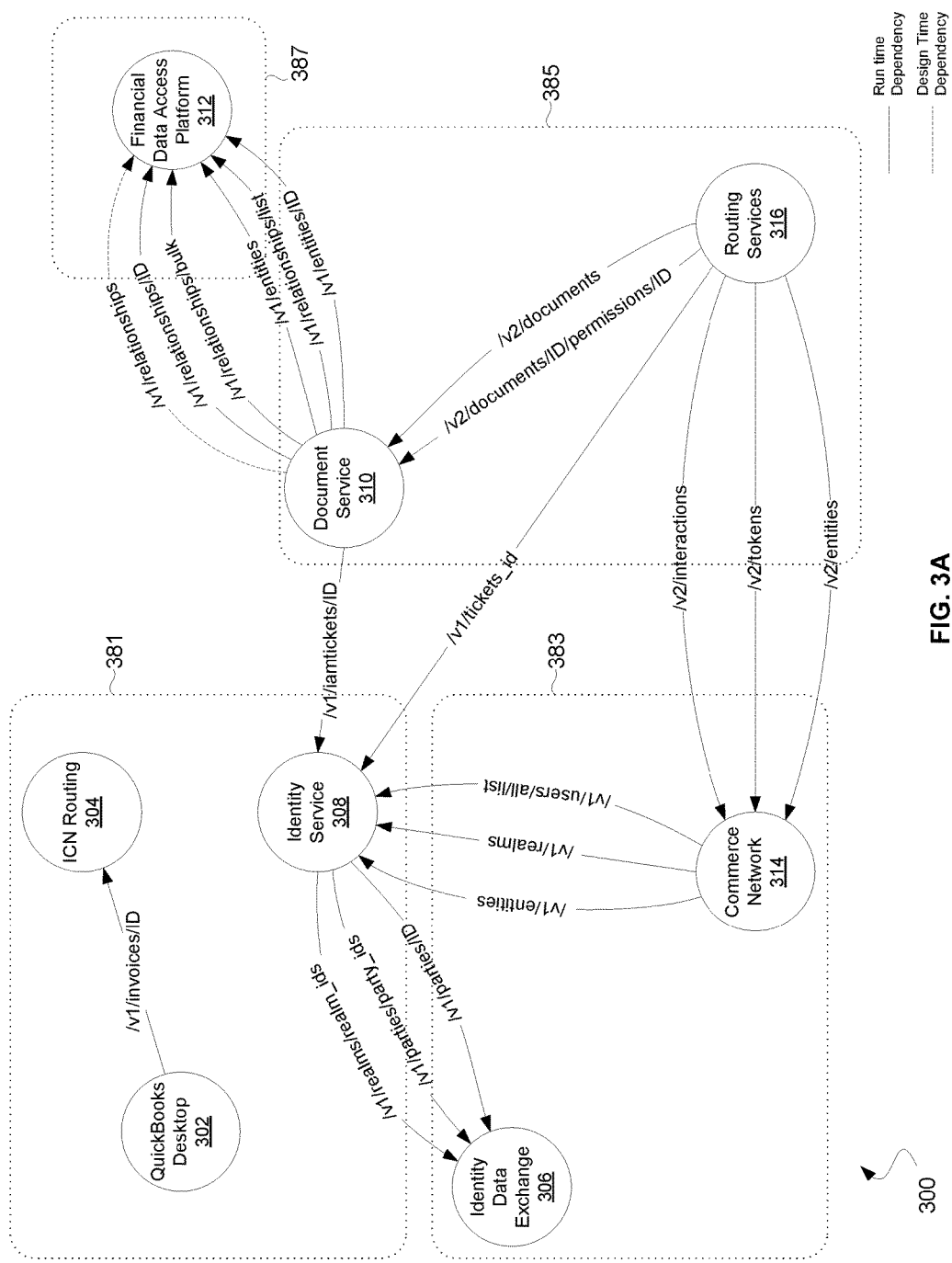
FIGS. 3A, 3B, and 3C show an example of monitoring API integrations, in accordance with one or more embodiments of the invention.
Figure 3B:
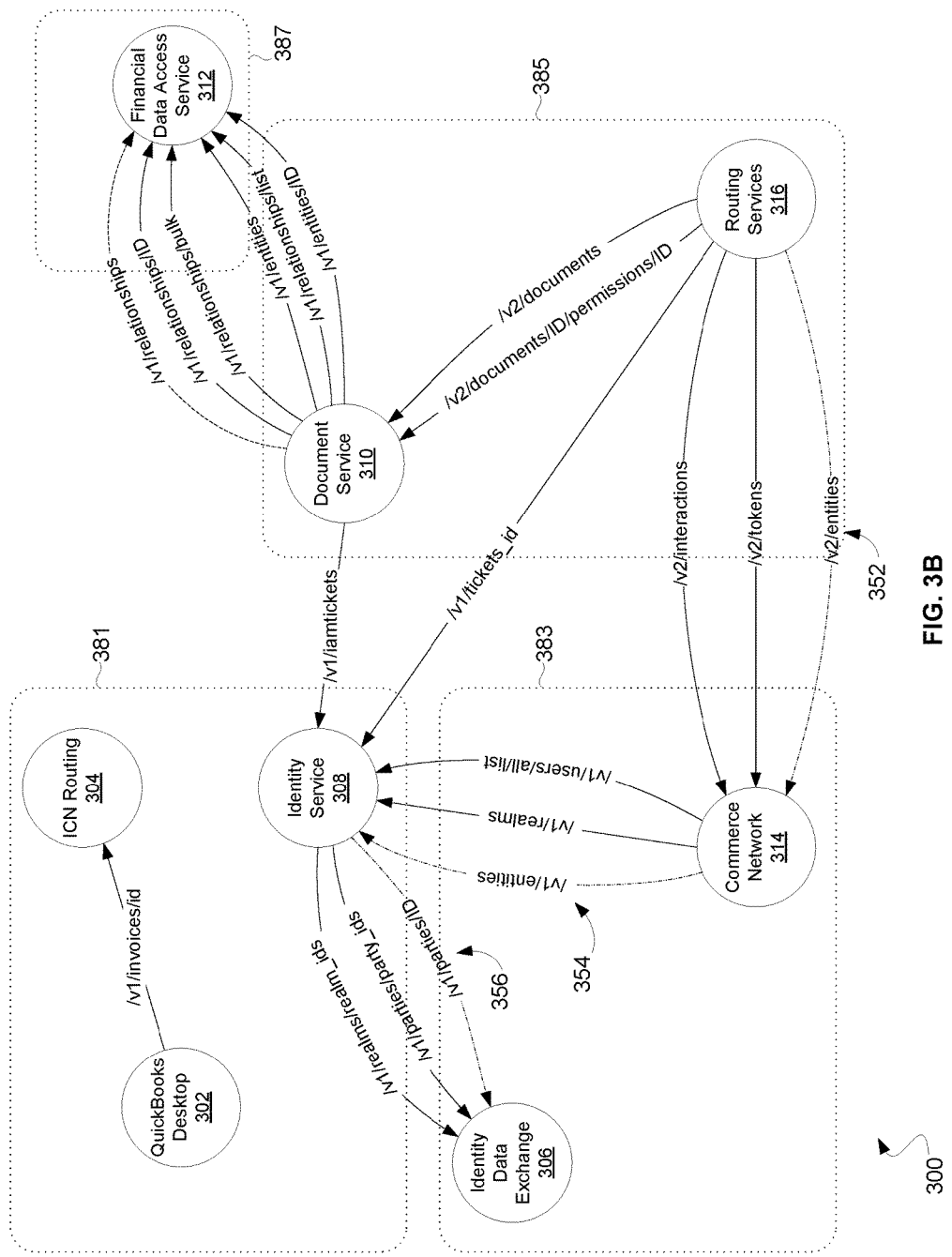
Figure 3C:
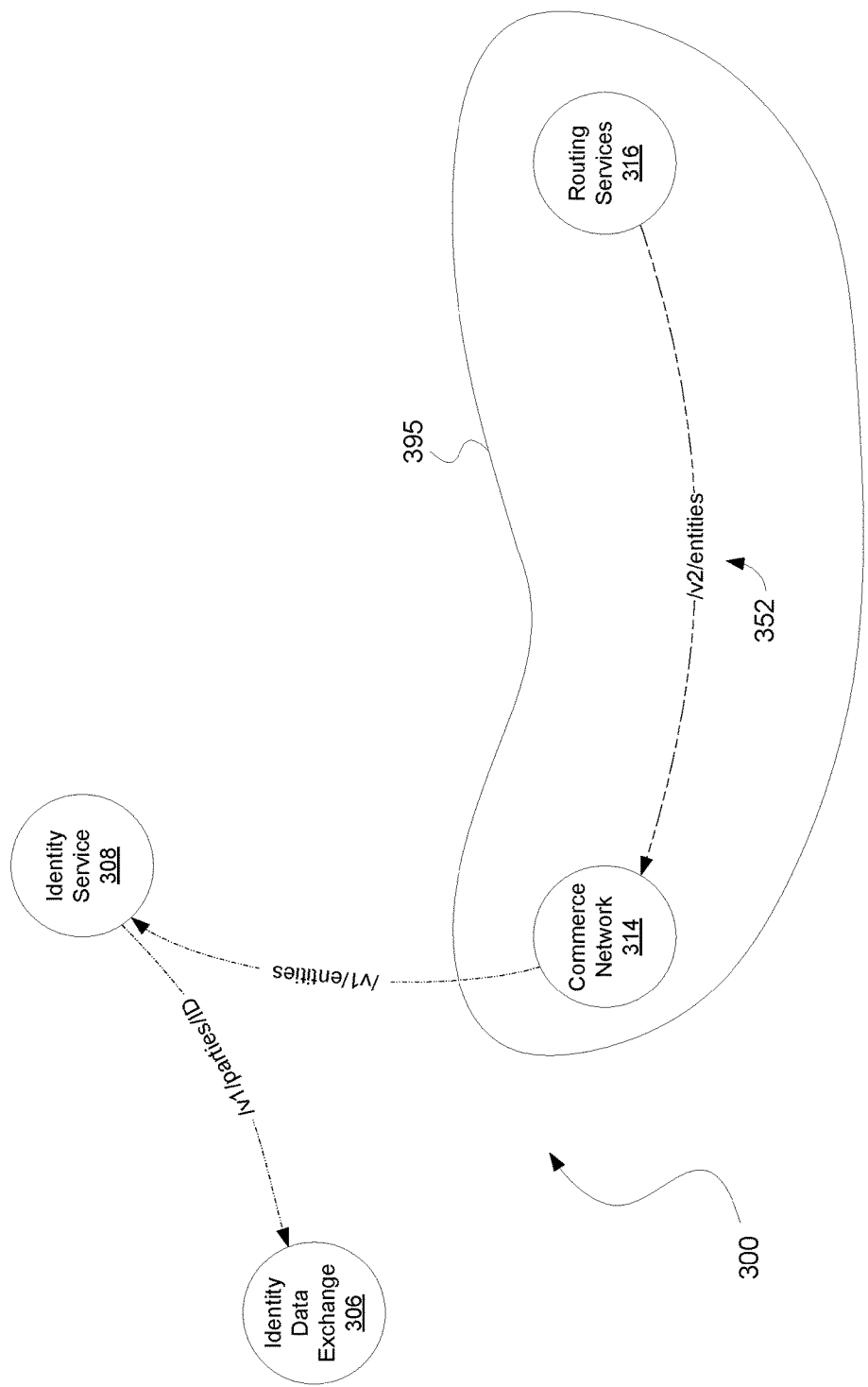

FIGS. 3A, 3B, and 3C show an example of monitoring API integrations, in accordance with one or more embodiments of the invention. This example may be practiced using the system (100) of FIGS. 1A and 1B, or the computing system (400) of FIG. 4, and be based on the method described with respect to FIG. 2 above.

FIG. 3A depicts a graphical representation of the operational state of a system (300). Specifically, the system (300) is shown to include a first services gateway (381), a second services gateway (383), a third services gateway (385), and a fourth services gateway (387). Although not shown, the system (300) may also include one or more analytics servers and/or services registries. Additionally, each of the services gateways (381, 383, 385, 387) is depicted to include one or more services executing thereon.

Specifically, the first services gateway (381) includes QuickBooks Desktop (302), ICN Routing (304), and Identity Service (308); the second services gateway (383) includes Identity Data Exchange (306) and Commerce Network (314); the third services gateway (385) includes Document Service (310) and Routing Services (316); and the fourth services gateway (387) includes Financial Data Access Platform (312).

As described hereinabove, any of the services (302-316) may receive and respond to requests from clients. Some of the clients may include client devices. For example, any of the services (302-316) may receive and respond to requests from applications that are executing on client devices (not shown). In order to respond to client requests, however, the services may call one or more other services to obtain data or perform some action, and, in turn, the other services may also call additional services, thereby creating a dependency chain.

For example, and as specifically depicted in FIG. 1A, during run time the QuickBooks Desktop platform (302) calls ICN Routing (304) via the "/v1/invoices/ID" API call. Similarly, Document Service (310) calls Identity Service (308) via the "/v1/iamtickets/ID" API call, and the Identity Service (308) calls the Identity Data Exchange (306) via the "/v1/realms/realm_ids" API call, "/v1/parties/party_ids" API call, and the "/v1/parties/ID" API call. Still yet, during run time, Routing Services (316) calls Document Service (310) via the "/v2/documents" API call and the "/v2/documents/ID/permissions/ID" API call. Accordingly, the calls may occur between services residing on the same services gateway, or between services residing on different services gateways. Other additional run time dependencies between the services (302-316) are depicted in FIG. 3A, but for purposes of brevity are not specifically described here.

Also, FIG. 3A is depicted to identify a design time dependency between Document Service (310) and Financial Data Access Platform (312). In one or more embodiments, Document Service (310) may have been previously on-boarded to Financial Data Access Platform (312), using, for example, an API portal. During the on-board process, the "/v1/relationships" API call was made available to Document Service (310). However, during run time of the system (300), Document Service (310) has not been monitored to make the particular call to Financial Data Access Platform (312). Accordingly, because Document Service (310) does not yet actively call Financial Data Access Platform (312) using the "/v1/relationships" API call, this particular dependency between the two services may be identified as a design time dependency.

By identifying both design time dependencies and run time dependencies that exist between various services residing across multiple services gateways, various contexts may be built around the dependencies. Moreover, using the contexts, a baseline state of the system (300) may be established. This baseline state may be used to rapidly identify and fix any problems that may arise in the system (300) at a future point in time.

FIG. 3B depicts the monitoring of a transaction through the system (300). As described above, a transaction may include one or more requests, and one or more responses to the one or more requests. More specifically, a transaction may begin with a service receiving a request to access a resource from another service, where the received request initiates a cascade of subsequent requests. Accordingly, the transaction may include a sequence of related requests. Moreover, the same transaction identifier may be associated with each request in the sequence, and its corresponding response, such that the sequence of related requests and responses are identified as a single transaction. Each transaction may be associated with its own unique transaction identifier.

As specifically depicted in FIG. 3B, a first request (352) from Routing Services (316) to Commerce Network (314) includes an API call to "/v2/entities." As an option, the first request (352) may be sent from Routing Service (316) to Commerce Network (314) in response to a request received from a client (i.e., client device) at Routing Services (316). In response to the first request (352), Commerce Network (314) sends a second request (354) to Identity Service (308). The second request includes an API call to "/v1/entities." Still yet, in response to the second request (354) received at Identity Service (308), Identity Service (308) sends a third request (356) to Identity Data Exchange (306). The third request includes an API call to "/v1/parties/ID." Moreover, for each of the requests (352-356), a corresponding response may be provided from the request-receiving service. In this way, a dependency chain is depicted to include the API calls of three sequential requests (352, 354, 356).

In one or more embodiments, transaction records may be generated for each of these requests and responses. Each transaction record may include the same transaction identifier, such that the requests and responses together evidence the same single transaction. Moreover, a context generator may analyze the transaction to create one or more contexts. In one or more embodiments, a context may be created for each identified service-service interaction. For example, a first context may be created for the dependency between Routing Services (316) and Commerce Network (314), a second context may be created for the dependency between Commerce Network (314) and Identity Service (308), etc.

As an option, these contexts may be used to set a baseline state of the system (300). Moreover, these contexts may be used to identify deviations from the baseline state that may indicate a problem with a service-service interaction or API integration.

In one or more embodiments, graphical depictions of the type presented in FIGS. 3A and 3B may be presented within a user interface of a computing system to an administrator or engineer, to facilitate a rapid understanding of service-service interactions within the system (300). The graphical depictions of FIGS. 3A and 3B may be considered end-to-end transaction graphs of the transactions in the system (300). Such transaction graphs may be built using the unique transaction identifiers of the transactions, the origins of the transactions, and the destinations of the transactions.

FIG. 3C shows a graphical representation of the state the system (300) after an interaction between two services has been disrupted. For example, new or updated code for a service may be deployed on one or more of the services gateways (381-387). As a result of the new code, a service may now respond to requests in a manner inconsistent with a prior configuration of the service. For example, the service may now provide a new status code that a client of the service has not been configured to receive or recognize. Because other services have been configured to specifically interact with the prior configuration of the service, and because of how dependencies are chained between the various services, the new status code results in errors that promulgate up and/or down the dependency chain.

As specifically depicted in FIG. 3C, a context (395) surrounding the dependency between Routing Services (316) and Commerce Network (314) has been identified to deviate from its previously established baseline in a manner that exceeds a threshold. For example, the time for a response to the first request (352) may now exceed a predetermined threshold (e.g., 300 milliseconds, 500 milliseconds, 1 second, etc.) beyond the established baseline response time. As another example, a number of times the first request (352) has failed within a given time period (e.g., 30 seconds, 1 minute, 30 minutes, 4 hours, 7 days, etc.) may now exceed a predetermined threshold (e.g., 1 time, 5 times, 30 times, 1,000 times, etc.).

In one or more embodiments, graphical depictions of the type presented in FIG. 3C may be presented within a user interface of a computing system to an administrator or engineer, to facilitate a rapid understanding of where the system (300) has begun deviating from its baseline operational performance. As depicted by FIG. 3C, in addition to the particular context (395), the interface may identify all services up or down the dependency chain that participate in the relevant transaction, such as Identity Service (308) and Identity Data Exchange (306). As an option, the user interface may also present to the administrator or engineer how the context (395) has departed from its expected values (i.e., a comparison of a number of successful vs. failed requests over time, etc.). In a system that may have, at any moment, thousands of different clients calling hundreds of different services through a single point of entry, it is important to be able to quickly identify any deviations from an expected baseline system performance, and to quickly ascertain the cause of such deviations.

Figure 4A:
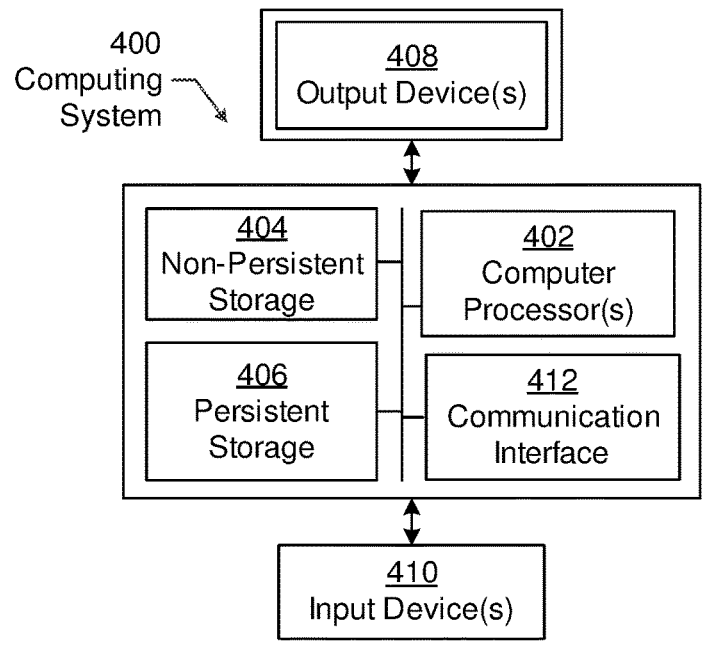
FIG. 4A shows a computing system, in accordance with one or more embodiments of the invention.

Embodiments of the invention may be implemented on a computing system. Any combination of mobile, desktop, server, router, switch, embedded device, or other types of hardware may be used. For example, as shown in FIG. 4A, the computing system (400) may include one or more computer processors (402), non-persistent storage (404) (e.g., volatile memory, such as random access memory (RAM), cache memory), persistent storage (406) (e.g., a hard disk, an optical drive such as a compact disk (CD) drive or digital versatile disk (DVD) drive, a flash memory, etc.), a communication interface (412) (e.g., Bluetooth interface, infrared interface, network interface, optical interface, etc.), and numerous other elements and functionalities.

The computer processor(s) (402) may be an integrated circuit for processing instructions. For example, the computer processor(s) may be one or more cores or micro-cores of a processor. The computing system (400) may also include one or more input devices (410), such as a touchscreen, keyboard, mouse, microphone, touchpad, electronic pen, or any other type of input device.

The communication interface (412) may include an integrated circuit for connecting the computing system (400) to a network (not shown) (e.g., a local area network (LAN), a wide area network (WAN) such as the Internet, mobile network, or any other type of network) and/or to another device, such as another computing device.

Further, the computing system (400) may include one or more output devices (408), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (402), non-persistent storage (404), and persistent storage (406). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

Figure 4B:
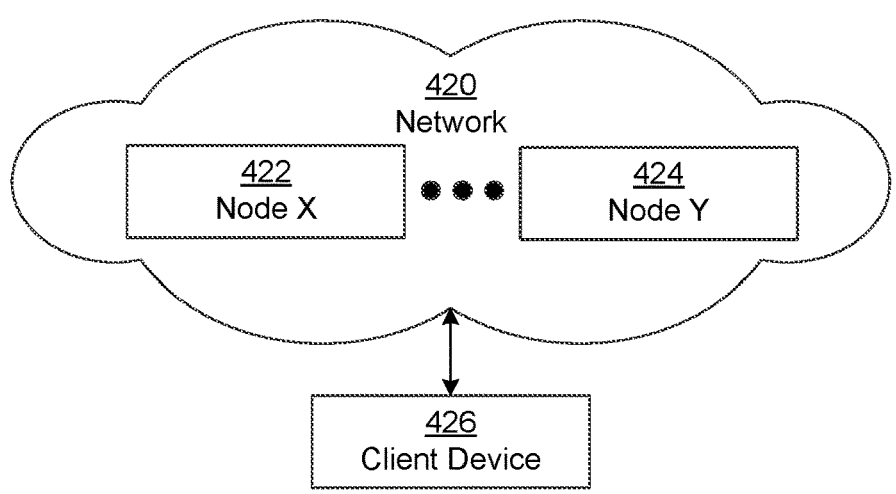
FIG. 4B shows a group of computing systems, in accordance with one or more embodiments of the invention.

The computing system (400) in FIG. 4A may be connected to or be a part of a network. For example, as shown in FIG. 4B, the network (420) may include multiple nodes (e.g., node X (422), node Y (424)). Each node may correspond to a computing system, such as the computing system shown in FIG. 4A, or a group of nodes combined may correspond to the computing system shown in FIG. 4A. By way of an example, embodiments of the invention may be implemented on a node of a distributed system that is connected to other nodes. By way of another example, embodiments of the invention may be implemented on a distributed computing system having multiple nodes, where each portion of the invention may be located on a different node within the distributed computing system. Further, one or more elements of the aforementioned computing system (400) may be located at a remote location and connected to the other elements over a network.

Although not shown in FIG. 4B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (422), node Y (424)) in the network (420) may be configured to provide services for a client device (426). For example, the nodes may be part of a cloud computing system. The nodes may include functionality to receive requests from the client device (426) and transmit responses to the client device (426). The client device (426) may be a computing system, such as the computing system shown in FIG. 4A. Further, the client device (426) may include and/or perform all or a portion of one or more embodiments of the invention.

The computing system or group of computing systems described in FIGS. 4A and 4B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file.

The computing system in FIG. 4A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g., ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The above description of functions present only a few examples of functions performed by the computing system of FIG. 4A and the nodes and/or client device in FIG. 4B. Other functions may be performed using one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for monitoring application program interface (API) integrations, comprising:
    deploying at least two services to a services registry of a services registry server;
    identifying a plurality of design time dependencies between the at least two services without calling and executing the at least two services;
    identifying, based on monitored transactions, a plurality of run time dependencies between the at least two services in a system,
        wherein each of the monitored transactions includes an origin and a destination, and
        wherein each of the monitored transactions is associated with a unique transaction identifier;
    building an end-to-end transaction graph of the monitored transactions in the system using the unique transaction identifiers of the monitored transactions, origins of the monitored transactions, and destinations of the monitored transactions;
    building a context of a set of contexts using the plurality of design time dependencies and the plurality of run time dependencies;
    utilizing the set of contexts, setting a baseline state of the system;
    storing the identified dependencies at the services registry;
    in response to determining that a current value of the context does not deviate beyond a pre-determined threshold from a historical value of the context, determining whether the system remains operational and transactions continue to flow; and
    in response to determining that the system remains operational, maintaining the set of contexts,
        wherein maintaining the set of contexts includes analyzing newly identified service dependencies and analyzing changes between previously identified interactions between the at least two services.

2. The method of claim 1, further comprising monitoring the contexts over time.

3. The method of claim 2, determining that a current value of one of the contexts deviates beyond a pre-determined threshold from a historical value of the one of the contexts.

4. The method of claim 3, further comprising, in response to determining that the current value of the one of the contexts deviates beyond the pre-determined threshold from the historical value of the one of the contexts, generating an alert.

5. The method of claim 2, further comprising maintaining the contexts by updating the contexts with new values.

6. A system for monitoring application program interface (API) integrations, comprising:
    a hardware processor and memory; and
    software instructions stored in the memory and configured to execute on the hardware processor, which, when executed by the hardware processor, cause the hardware processor to:
    deploy at least two services to a services registry of a services registry server;
    identify a plurality of design time dependencies between the at least two services without calling and executing the at least two services;
    identify, based on monitored transactions, a plurality of run time dependencies between the at least two services in a server,
        wherein each of the monitored transactions includes an origin and a destination, and
        wherein each of the monitored transactions is associated with a unique transaction identifier;
    building an end-to-end transaction graph of the monitored transactions in the system using the unique transaction identifiers of the monitored transactions, origins of the monitored transactions, and destinations of the monitored transactions;
    build a context of a set of contexts using the plurality of design time dependencies and the plurality of run time dependencies;
    utilizing the set of contexts, set a baseline state of the system;
    storing the identified dependencies at the services registry;
    in response to determining that a current value of the context does not deviate beyond a pre-determined threshold from a historical value of the context, determine whether the system remains operational and transactions continue to flow; and
    in response to determining that the system remains operational, maintain the set of contexts,
        wherein maintaining the set of contexts includes analyzing newly identified service dependencies and analyzing changes between previously identified interactions between the at least two services.

7. The system of claim 6, wherein the software instructions stored in the memory, when executed by the hardware processor, further cause the hardware processor to monitor the contexts over time.

8. The system of claim 7, wherein the software instructions stored in the memory, when executed by the hardware processor, further cause the hardware processor to determine that a current value of one of the contexts deviates beyond a pre-determined threshold from a historical value of the one of the contexts.

9. The system of claim 8, wherein the software instructions stored in the memory, when executed by the hardware processor, further cause the hardware processor to generate an alert in response to determining that the current value of the one of the contexts deviates beyond the pre-determined threshold from the historical value of the one of the contexts.

10. The system of claim 7, wherein the software instructions stored in the memory, when executed by the hardware processor, further cause the hardware processor to maintain the contexts by updating the contexts with new values.

11. A non-transitory computer readable medium for monitoring application program interface (API) integrations comprising instructions that, when executed by a processor, perform:

deploying at least two services to a services registry of a services registry server;

identifying a plurality of design time dependencies between the at least two services without calling and executing the at least two services;

identifying, based on monitored transactions, a plurality of run time dependencies between the at least two services in a server, wherein each of the monitored transactions includes an origin and a destination, and wherein each of the monitored transactions is associated with a unique transaction identifier;

building an end-to-end transaction graph of the monitored transactions in the system using unique transaction identifiers of the monitored transactions, origins of the monitored transactions, and destinations of the monitored transactions;

building a context of a set of contexts using the plurality of design time dependencies and the plurality of run time dependencies;

utilizing the set of contexts, setting a baseline state of the system;

storing the identified dependencies at the services registry;

in response to determining that a current value of the context does not deviate beyond a pre-determined threshold from a historical value of the context, determining whether the system remains operational and transactions continue to flow; and in response to determining that the system remains operational, maintaining the set of contexts, wherein maintaining the set of contexts includes analyzing newly identified service dependencies and analyzing changes between previously identified interactions between the at least two services.

* * * * *